(12) United States Patent
Singh et al.

(10) Patent No.: US 10,275,957 B2
(45) Date of Patent: Apr. 30, 2019

(54) METHODS, SYSTEMS AND DEVICES FOR ACCESS CONTROL

(71) Applicant: MASTERCARD INTERNATIONAL INCORPORATED, Purchase, NY (US)

(72) Inventors: Vijendra Pratap Singh, Maharashtra (IN); Krupal Ghorpade, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 15/799,189

(22) Filed: Oct. 31, 2017

(65) Prior Publication Data

US 2018/0122166 A1 May 3, 2018

(30) Foreign Application Priority Data

Nov. 2, 2016 (SG) .............................. 10201609189X

(51) Int. Cl.
*G07C 9/00* (2006.01)
*G06Q 50/30* (2012.01)
*G06Q 10/02* (2012.01)

(52) U.S. Cl.
CPC ..... *G07C 9/00071* (2013.01); *G07C 9/00087* (2013.01); *G07C 9/00103* (2013.01); *G07C 9/00904* (2013.01); *G06Q 10/02* (2013.01); *G06Q 50/30* (2013.01)

(58) Field of Classification Search
CPC ............ G07C 9/00071; G07C 9/00904; G06Q 10/02; G06Q 50/30

USPC ........................................................ 340/5.52
See application file for complete search history.

(56) References Cited

U.S. PATENT DOCUMENTS

| | | | |
|---|---|---|---|
| 8,694,793 B2 | 4/2014 | Evans | |
| 8,831,677 B2 | 9/2014 | Villa-Real | |
| 9,087,204 B2 | 7/2015 | Gormley et al. | |
| 9,424,547 B2 | 8/2016 | Gazdzinski et al. | |
| 9,667,627 B2 | 5/2017 | Gormley et al. | |
| 2007/0288998 A1 | 12/2007 | Gudigara et al. | |
| 2011/0205016 A1* | 8/2011 | Al-Azem | G06F 21/32 340/5.52 |
| 2013/0305059 A1* | 11/2013 | Gormley | G07F 7/08 713/189 |
| 2014/0136419 A1 | 5/2014 | Kiyohara | |
| 2015/0195288 A1* | 7/2015 | Hoyos | H04L 63/10 726/4 |

(Continued)

*Primary Examiner* — Hirdepal Singh
(74) *Attorney, Agent, or Firm* — Armstrong Teasdale LLP

(57) ABSTRACT

Methods, systems and devices for access control are provided. The present disclosure provides a communication device of a user communicating access details associated with the facility, to a client system within the vicinity of which the communication device is located, and the client system verifying the access details and transmitting an electronic request to a host server. Further, the host server transmits a request notification to the communication device requesting authentication of an identity of the user using an input of a biometric sample of the user on the communication device. The host server then obtains an outcome of the authentication, and causes the user to be authorized in response to a positive outcome of the authentication as well as the verification.

19 Claims, 6 Drawing Sheets

(56) References Cited

U.S. PATENT DOCUMENTS

| | | | |
|---|---|---|---|
| 2015/0294313 A1* | 10/2015 | Kamal | G06Q 20/401 |
| | | | 705/44 |
| 2017/0076293 A1* | 3/2017 | Cage | G06Q 20/40145 |
| 2017/0220762 A1* | 8/2017 | Toupin | G06F 19/3456 |
| 2017/0249451 A1* | 8/2017 | Andreeva | G06F 21/32 |
| 2018/0232740 A1* | 8/2018 | Brown | G06Q 20/40145 |

* cited by examiner

METHODS, SYSTEMS AND DEVICES FOR ACCESS CONTROL

CROSS REFERENCE TO RELATED APPLICATIONS

This patent application claims priority to Singapore Application No. 10201609189X filed on Nov. 2, 2016, the disclosure of which is incorporated by reference herein in its entirety as part of the present application.

BACKGROUND

The present disclosure relates to methods, systems and devices for access control, and in particular for controlling access to a facility such that unauthorized or unauthenticated personnel is prevented from gaining access to the facility.

In the present disclosure, the term "facility" may be defined as a place, amenity, or piece of equipment provided for a particular purpose. For example, a facility may be an establishment, a premises or a location which a user can access, occupy, and use. For example they may include, but are not limited to travel-related facilities such as airport check-in counters or boarding gates or electronic access gates or devices.

Conventionally, before boarding a flight, a passenger goes to a check-in counter at the airport to complete formalities procedures and collects a boarding pass. For example, the airport staff is typically required authenticate the identity of the passenger, for example, by comparing the photograph of the passenger's passport or other photo IDs with the passenger himself or herself at the check-in counter. The airport staff, who is typically associated with an airline company, also verifies booking details or ticket information of the passenger against the airline's database to confirm that a seat is available for allocation to the passenger. Upon completion of the above procedures, a boarding-pass is issued to the passenger which allows the passenger to enter an access-controlled area (such as for security or immigration clearance) upon presenting the boarding-pass and the passport or other identity document. Several rounds of verification and authentication are performed in a few other instances before the passenger reaches the boarding gate. In particular, passenger's boarding pass is verified against the identity document with the physical presence of the passenger before officers for security check, immigration clearance, and/or at the boarding-gate before boarding the airplane.

Such processes are tedious, time-consuming, and cumbersome for both passengers and the officers. Passengers may run a risk of missing the flights due to the delay caused by such processes, especially when the volume of traffic at the airport is large which significantly increases the waiting time for passengers. In addition, the existing verification and authentication process may be prone to errors, as the officers may be required to check through various documentation of a large number of passengers in great detail every day.

Therefore, it is desirable to provide an improved method and system for access control, such as, but not limited to controlling access to access-restricted premises.

BRIEF DESCRIPTION

The present disclosure provides a computerized method for access control, which includes receiving from a communication device of a user, access details associated with the facility, verifying the access details of the user, transmitting a request notification to the communication device to request authentication of an identity of the user using an input of a biometric sample of the user on the communication device, obtaining an outcome of the authentication; and causing authorization of the user to access the facility in response to a positive outcome of the authentication and the verification.

A first aspect of the present disclosure provides a computerized method for controlling access to a facility. The method includes receiving, at a detection unit from a communication device of a user, access details associated with the facility, said communication device being located in the vicinity of the detection unit, verifying the access details of the user, transmitting an electronic request to a server for authentication of an identity of the user using an input of a biometric sample of the user on the communication device of the user, and authorizing the user to access the facility in response to (i) receiving a positive outcome of the authentication from the server, and (ii) a positive outcome of the verification.

Typically, this method is performed by a server operated by, or otherwise associated with the facility. The access details of the user may be verified using a database which stores records of access details of users who are authorized to access the facility. The access details may contain information relating to conditions under which the access may be authorized, and such condition may be, for example, a specific duration for which the access will be authorized.

This may allow a user to gain access to the access-controlled facility automatically, without manual verification of the access details and manual authentication of the user's identity. Specifically, verification of the access details of the user may be performed automatically by the facility, together with obtaining authentication of the identity of the user by leveraging upon an input of the user's biometric data on the user's communication device. The fact that the users providing the biometric data via their mobile devices may eliminate the need for the facility to provide input terminals for collection of the user's biometric samples. In addition, the facility may obtain the outcome of authentication from a trusted server without having to carrying out the authentication process by itself. This may not only reduce the burden of the facility to meet security standards in order to handle and store sensitive biometric data of users in a database, but also reduces the computational requirements of the facility to determine, for a given test sample, if a corresponding matching sample is found in the database so as to authentication of the identity of the user. Similarly, the user may simply use his or her communication device to both communicate the access details for verification and also perform authentication of himself or herself so as to gain access to the facility using a fully automated system network.

In some embodiments, the access details may include at least one of (i) information associated with the user's identity, and (ii) information associated with the user's use or reservation of the facility.

In some embodiments, the step of authorizing the user may include electronically generating a token to allow access to the facility upon presentation of the token by a user.

In another embodiment, the step of authorizing the user to access the facility may include generating authorization data for deactivating a security mechanism maintained by the facility. The security mechanism, when in an activated state, prevents access to the facility. Optionally, an authorization notification encoding the authorization data may be transmitted to the communication device of the user to cause the security mechanism to be deactivated upon the communication device communicating the authorization notification to the security mechanism. According to one particular example, the security mechanism is an access control gate located in the vicinity of the facility.

In some embodiments, the method may include transmitting the electronic request in response to a positive outcome of the verification of the access details.

The present disclosure also provides an apparatus for controlling access to a facility. The apparatus has a processor and a data storage device storing program instructions being operative to cause the processor to carry out any one of the methods described above. The apparatus may be a server.

In another embodiment, the apparatus includes a detection unit configured to receive, from a communication device of a user, access details associated with the facility, the communication device being located in the vicinity of the detection unit, a verification unit in communication with the detection unit, the verification unit being configured to verify the access details of the user, a communication unit operable to be in communication with a server, said communication unit being configured to transmit an electronic request to a server for authentication of an identity of the user using an input of a biometric sample of the user on the communication device of the user, and an authorization unit configured to authorize the user to access the facility in response to (i) receiving a positive outcome of the authentication from the server, and (ii) a positive outcome of the verification by the verification unit.

In some embodiments, the authorization unit may be configured to electronically generate a token to allow access to the facility by a user upon presentation of the token. The access details may include at least one of (i) information associated with the user's identity, and (ii) information associated with the user's use or reservation of the facility.

In some embodiments, the authorization unit may be configured to generate authorization data for deactivating a security mechanism maintained by the facility. The security mechanism, when in an activated state, prevents access to the facility.

In some embodiments, the authorization unit may be configured to transmit an authorization notification encoding the authorization data to the communication device of the user to cause the security mechanism to be deactivated upon the authorization notification being communicated to the security mechanism by the communication device.

In some embodiments, the apparatus may further include the security mechanism which is an access control gate located in the vicinity of the facility.

In some embodiments, the communication unit may be configured to transmit the electronic request in response to a positive outcome of the verification of the access details.

A further aspect provides a computerized method performed by a server for controlling access to a facility. The method includes in response to receiving an electronic request for authentication of an identity of a human subject from a client: identifying, based on the electronic request, a communication device associated with the human subject, transmitting a request notification to the communication device, said request notification requesting authentication of an identity of the human subject using an input of a biometric sample of the user on the communication device, receiving the biometric sample from the communication device, and obtaining an outcome of the authentication using the biometric sample and a reference database storing biometric data associated with a plurality of pre-registered users, and communicating the outcome of the authentication to the client to cause authorization of the user to access the facility in response to a positive outcome of the authentication.

In some embodiments, causing authorization of the user to access the facility may include generating authorization data for deactivating a security mechanism maintained by the facility. The security mechanism, when in an activated state, prevents access to the facility.

In some embodiments, the electronic request may encode information associated with the user's identity and/or information associated with the user's use or reservation of the facility.

A further aspect provides a computer server for controlling access to a facility, the computer server including a server processor, a data storage device storing server processor program instructions, the server processor program instructions being operative to cause the server processor to perform any one of the method described above.

The present disclosure further provides a software product, such as at a time when it is stored in a non-transitory form on a tangible data storage device. The data storage device may be within the server, or it may be a database from which a processor of the server is able to download the software. In particular, there is proposed a program product including computer program instructions which is operative, when implemented by a processor, to cause the processor to perform any one of the methods described above.

A further aspect provides a method performed by a communication device associated with a user for obtaining an authorization to access a facility. The method includes communicating, in the vicinity of a facility, access details associated with the facility to a first system for verification of the access details of the user by the first system, receiving a request notification from a second system, the request notification requesting authentication of an identity of the user, receiving an input of a biometric sample of the user on the communication device in response to the request notification, and transmitting the input of the biometric sample to the second system for authentication of the identity of the user by the second system, thereby causing the user to be authorized to access the facility, in response to (i) the first system receiving a positive outcome of the authentication from the second system, and (ii) a positive outcome of the verification by the first system.

In some embodiments, the request notification may be received in response to a positive outcome of the verification.

In some embodiments, causing the user to be authorized to access the facility may include the communication device receiving an authorization notification, from the first system, to deactivate the security mechanism. The security mechanism, when in an activated state, prevents access to the facility.

In some embodiments, the access details may include at least one of (i) information associated with the user's identity, and (ii) information associated with the user's use or reservation of the facility.

In some embodiments, the biometric sample of the user may include a face photograph of the user.

A further aspect provides a communication device. The communication device includes a processor and a data storage device storing program instructions, the program instructions being operative to perform any one of the method described above.

The present disclosure further provides a software product, such as at a time when it is stored in a non-transitory form on a tangible data storage device. The data storage device may be within a communication device of a user, or it may be a database from which the communication device is able to download the software. In particular, there is provided a program product including computer program instructions which is operative, when implemented by a processor of a communication device, to cause the processor to perform any one of the methods described above.

As used in this document, the term "facility" may be defined as a place, amenity, or piece of equipment provided for a particular purpose. For example, a facility may be an establishment, a premises or a location which a user can access, occupy, and use. For example they may include, but are not limited to travel-related facilities (e.g. airport check-in counters or boarding gates, coaches, trains, etc.), or electronic access gates or devices. Typically, they are associated with secure locations or private locations that require security measures. Further examples of such facilities may include residences, dormitories, gateways, lifts/elevators, hotels/hotel rooms, accommodation/lodging rooms, and conference or meeting venues. A facility may also be an article or equipment which the user can access to use or operate. The equipment may include, but is not limited to, boarding-pass self-printing systems, rental vehicles, storage lockers, safe deposit boxes, and computer/electronic devices/machines. Notably, in some instances access to such facilities is controlled by a physical lock, and in other instances access is controlled by a virtual lock (e.g. preventing printing of boarding-passes for unauthorized or unauthenticated passengers).

All operations of the proposed methods may be-performed automatically. The term "automatic" is used in this document to refer to a process which is performed substantially without human involvement, save possibly for initiation of the process.

Within the scope of this disclosure it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

Embodiments of the disclosure will now be described by way of example only with reference to the following drawings, in which.

DETAILED DESCRIPTION

Figure 1:
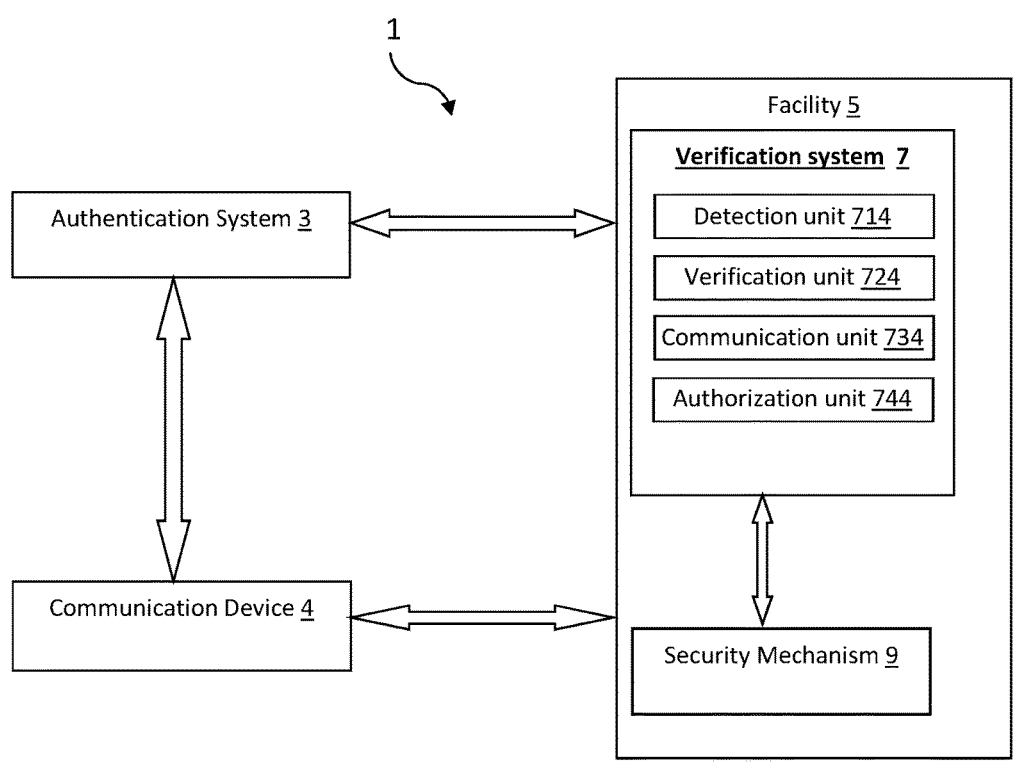
FIG. 1 shows a computerized network which is suitable to perform a method according to the present disclosure.

Referring to FIG. 1, a computerized network 1 is shown which is suitable for performing methods of the present disclosure.

The computerized network 1 includes an authentication system 3 in communication with a verification system 7 that is maintained by a facility 5. The facility 5 has a security mechanism 9 for controlling access to the facility 5. In particular, the security mechanism 9, in an activated state, prevents access to the facility 5. The security mechanism 9 may be deactivated by the verification system 7 thereby permitting access to the facility 5. Typically, the security mechanism 9 is maintained in an activated state to keep the facility 5 in a secured state. The security mechanism 9 may, for example, be turnstiles coupled to an electronic or digital lock, which in its activated state, maintains the facility 5 in an inaccessible state. The security mechanism 9 may also be a virtue lock such as a software component which prevents unauthorized access to a particular functionality of a computer system so as to generate a certain output from the computer system.

In addition, the facility 5 is configured to be in two-way communication with a communication device 4, such as a mobile phone of a user. For example, the facility 5 may receive data communication from the user's mobile phone via a detection unit 714 of the verification system 7. In one example, the detection unit 714 is arranged in close proximity with the security mechanism 9 to receive data from the communication device 4 upon it approaching the security mechanism 9. The detection unit 714, in one example, may be a quick-response (QR) code reader, which reads the access details represented by a QR code. In another example, the detection unit 714 may be near-field communication (NFC) component arranged to read or receive the access details from a nearby communication device 4 via the NFC protocol. The verification system 7 has a verification unit 724, a communication unit 734, and an authorization unit 744 which are operable to process the access details and grant permission to authorized users to access the facility 5, according to the method of the present disclosure. It will be understood that each of the verification system 7 and the authentication system 3 has a processor and a memory configured to store computer-readable instructions to cause the processor to perform corresponding operations upon execution of the computer program instructions. It will be understood that the function of the various units of the verification system 7 (e.g. the verification unit 724) may be achieved by the processor executing corresponding computer program instruction, and optionally with other hardware components such as input/output terminals and network connectivity devices functionally coupled to the processor. The technical architectures of the authentication system 3 and verification system 7 are described in more detail later.

Although not illustrated by FIG. 1, a skilled person in the art would understand that it may not be necessary for the authentication system 3 and/or verification system 7 or certain components thereof to be physically located at or near the premises or site of the facility 5. For example, the server processors of the authentication system 3 and verification system 7 are typically located remotely away from the facility 5.

As will be understood by a skilled person in the art, each of the systems/device in the computerized network 1 may have an appropriate communication module such as wireless interface for two-way communication between one and another via a communication network. The communication network could be any types of network, for example, virtual private network (VPN), the Internet, a local area and/or wide area network (LAN and/or WAN), 3G, 4G and so on. It will also be understood that although only one communication device 4 is illustrated by FIG. 1, there are typically a plurality of communication devices which are configured to be communicatively coupleable to the authentication system 3 and the facility 5. In addition, communication devices may further include personal digital assistants (PDAs), key fobs, transponder devices, NFC-enabled devices, tablets, portable display devices, and/or computers.

Exemplary methods of the present disclosure will now be illustrated with reference to FIGS. 2-4 in which the operations are enumerated. It should also be noted that enumeration of operations is for purposes of clarity and that the operations need not be performed in the order implied by the enumeration.

Figure 2:
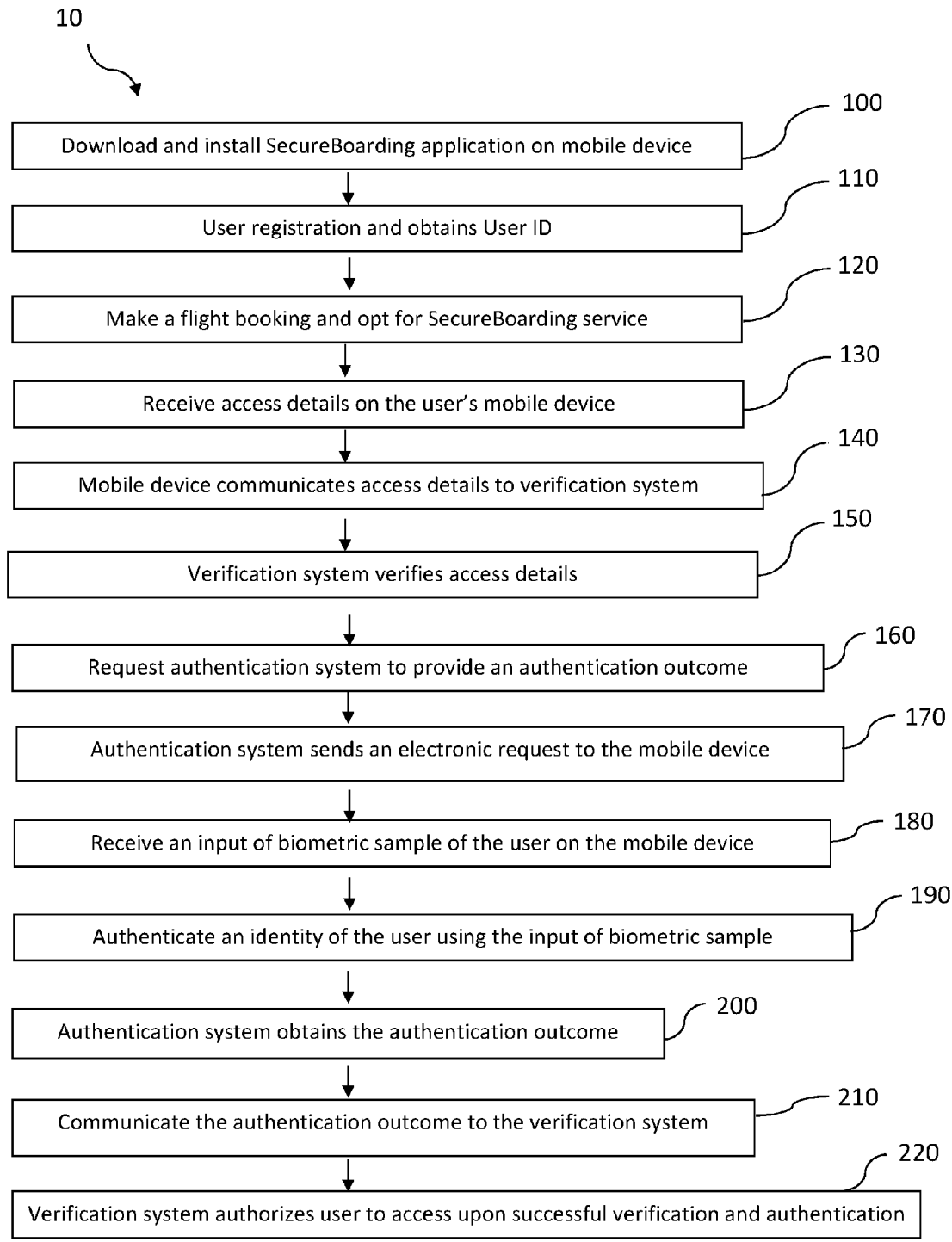
FIG. 2 is a flow diagram of an exemplary method according to one embodiment.

Referring to FIG. 2, an exemplary method 10 is illustrated with reference to obtaining authorization to access to access-controlled areas of airport premises by a user, for example, access to a boarding gate by a passenger at the airport. It will be understood that the present disclosure may be applicable to access control of other facilities at the airport or elsewhere.

At step 100, a user downloads and installs a software application (referred to as the "SecureBoarding" application) on the communication device 4. The software application is configured to cause the processor of the communication device 4 to perform the method of the present disclosure as will be described below.

At step 110, the user proceeds to register himself or herself through a one-time registration process to avail himself or herself of the SecureBoarding service as proposed by the present disclosure. Upon successful registration, a unique identifier or user identification (User ID) is assigned to the user and communicated to the user's communication device 4. The User ID is associated with the user's identity and biometric data. This is described in more detail with respect to FIG. 3 below. It will be understood that steps 100 and 110 are typically a one-off process for first-time users of the SecureBoarding application. In any subsequent use, the user may be identified by his User ID and will be able to continue using the application by logging in as an existing user with appropriate credentials such as the User ID, password and/or the user's biometric data.

At step 120, the user makes a flight booking, for example, via a website, and the user may opt for the SecureBoarding service during the booking. For example, the user may be prompted to provide his or her SecureBoarding User ID in connection with a flight booking. For a user who has not registered for the SecureBoarding service, the website may re-direct the user to a registration process for the user to complete the registration, for example, by following step 110. In some embodiments, biometric authentication from the user may be required before the flight booking is allowed, for example, if the user wishes to book a flight using the SecureBoarding application on his or her communication device 4 and automatically avails himself or herself of the SecureBoarding service for a particular flight booking. According to another example, the website may request the user to perform biometric authentication for a given User ID input by the user, using a user's input of biometric data on the user's communication device 4. If the authentication is unsuccessful after three attempts, the website may only allow the user to make a flight booking in a conventional way, and without availing the user of the SecureBoarding service. Upon successful authentication, flight booking details are communicated to the airport. The flight booking details may include one or more of the following: a departure city, a destination city, flight number, departure date, departure time, airline information, a booking reference number, as well as name and other identity information of the passenger. For example, the flight booking details may be stored in a passenger database accessible by the verification system 7. In addition, the User ID and/or flight booking details in connection with a flight booking may be transmitted to the authentication system 3. It will be understood that the user may also opt for SecureBoarding service after the booking, such as by adding relevant itinerary/flight booking reference in the SecureBoarding application to link the flight booking with the particular user.

At step 130, the user receives access details on his or her communication device 4 for gaining access to the boarding gate area via the SecureBoarding service. The access details typically include the flight information such as the fight passenger name record (PNR) which includes itinerary information. In particular, the access details may include one or more of the following: a departure city, a destination city, flight number, departure date, departure time, airline information, as well as name and other identity information of the passenger. The access detail may alternatively or additionally include a part or whole of the flight booking details such as the booking reference number.

The access details may be received by the user via a SMS, email, or any other notification via the communication device 4. In one example, the access details are received in a form of a QR code via the SecureBoarding mobile application. The QR code may be sent to the user's communication device 4 by the authentication system 3 or the verification system 7 upon completion of the flight booking. In some embodiments, the QR code is received by the communication device 4 within a pre-defined time prior to the scheduled departure time.

Airport premises enabled with SecureBoarding services may be equipped with a security mechanism 9 such as a turnstile positioned at an entrance of an access-controlled area. The turnstile is configured to, in its default state, prevent entry to the access-controlled area. The verification system 7 is operable to deactivate the turnstile thereby permitting entry to the access-controlled area by one person per operation. In order to gain access to the access-controlled area, the user places the communication device 4 in close proximity with the QR reader located at the turnstile at step 140, so that the access details encoded by the QR code are received by the verification system 7.

At step 150, the verification unit 724 receives the access details and performs verification of the access details. Typically, this is performed by comparing the access details against the passenger database to determine if there is a matching entry exists in the passenger database. The passenger database stores itinerary information of passengers who are therefore authorized to enter the access-controlled area in the airport at a specific time to fulfill the itinerary. If the verification is not successful, the user will be denied from entering the access-controlled area.

If the verification is successful, the communication unit 734 of the verification system 7 at step 160 transmits an electronic request to the authentication system 3 for authentication of an identity of the user using an input of a biometric sample of the user on the communication device 4. In response to the electronic request, at step 170, the authentication system 3 transmits a request notification to the communication device 4. As will be described below, the authentication system 3 maintains records of the user's identity and communication device corresponding to a given User ID. In use, in response to an electronic request received from the verification system 7, which includes information indicative of the User ID, the authentication system 3 identifies the user and transmits the request notification to the communication device 4 of the user accordingly. The request notification prompts the user to input his or her biometric sample on the communication device 4 via an input terminal of the communication device 4.

At step 180, the communication device 4 receives an input of the biometric sample of the user. The biometric sample of the user is authenticated in step 190 by comparing the received biometric sample against a reference biometric data previously registered by the user. At step 200, the authentication system 3 is configured to obtain an outcome of the authentication and communicate it to the verification system 7 at step 210. The authentication of the biometric sample is performed by the authentication system 3 which will be described in more detail with reference to FIG. 4.

If the outcome of the authentication is positive, the verification system 7 is configured to authorize the user to again access to the access-controlled area by deactivating the security mechanism at step 220.

In this embodiment, the turnstile is deactivated to allow the user to enter. In particular, the turnstile may be deactivated directly by the verification system 7 which operably controls the electronic or digital lock coupled to the turnstile. In another example, the verification system 7 is configured to generate an authorization notification and send it to the communication device 4. The authorization notification encodes authorization data configured to deactivate the turnstile. For example, the authorization notification may be in a form of a QR code readable by a QR reader in communication with the electronic lock which operates to control the turnstile. For enhanced security, the QR code generated by the verification system 7 may be a dynamic QR code, which is valid for a pre-defined time duration, such as up to 5 seconds. The QR reader for receiving the authentication notification may be the same as or different from detection unit 714 which is configured to receive the access details at step 140.

In the embodiment described above, the verification system 7 is configured to transmit a request for authentication of the identity of the user to the authentication system 3 in response to a positive outcome of the verification. It will be understood that the request may be sent to the authentication system 3 prior to the outcome of the verification is known. In other words, the authentication and verification may be performed concurrently and the verification system 7 may grant authorization to the user to access the facility 5 upon both the authentication and verification being successful.

In another embodiment, the steps 140-220 may be performed for gaining access to another facility at the airport, such as a boarding-pass self-printing system. Accordingly, the user may be directed to scan the QR code encoding the access details at the boarding-pass self-printing kiosk to initiate the process. Upon successful verification and authentication, the verification system 7 may cause the security mechanism 9 (which may be a virtue lock in this example) to be deactivated so as to access the printing system for issuance of a boarding-pass to the user. The boarding pass may be generated electronically in a printed hardcopy, and/or in an electronic form which is sent to the communication device 4 of the user.

As described above, the proposed methods may allow the facility to cause the authentication process individual users to be performed by a trusted authentication system (e.g. the authentication system 3) using an input of biometric data on the user's communication device. The facility may obtain the outcome of the authentication and make a determination as to whether to authorize the user to access the facility. In certain embodiments, the facility may simply request the authentication by providing only the user's ID in the electronic request to the authentication system 3, i.e. without disclosing the user's reservation details with the facility to the authentication system 3. This may also allow the facility to operate independently from the authentication system thereby preserve personal information relating the user as well as business information relating to the facility.

Figure 3:
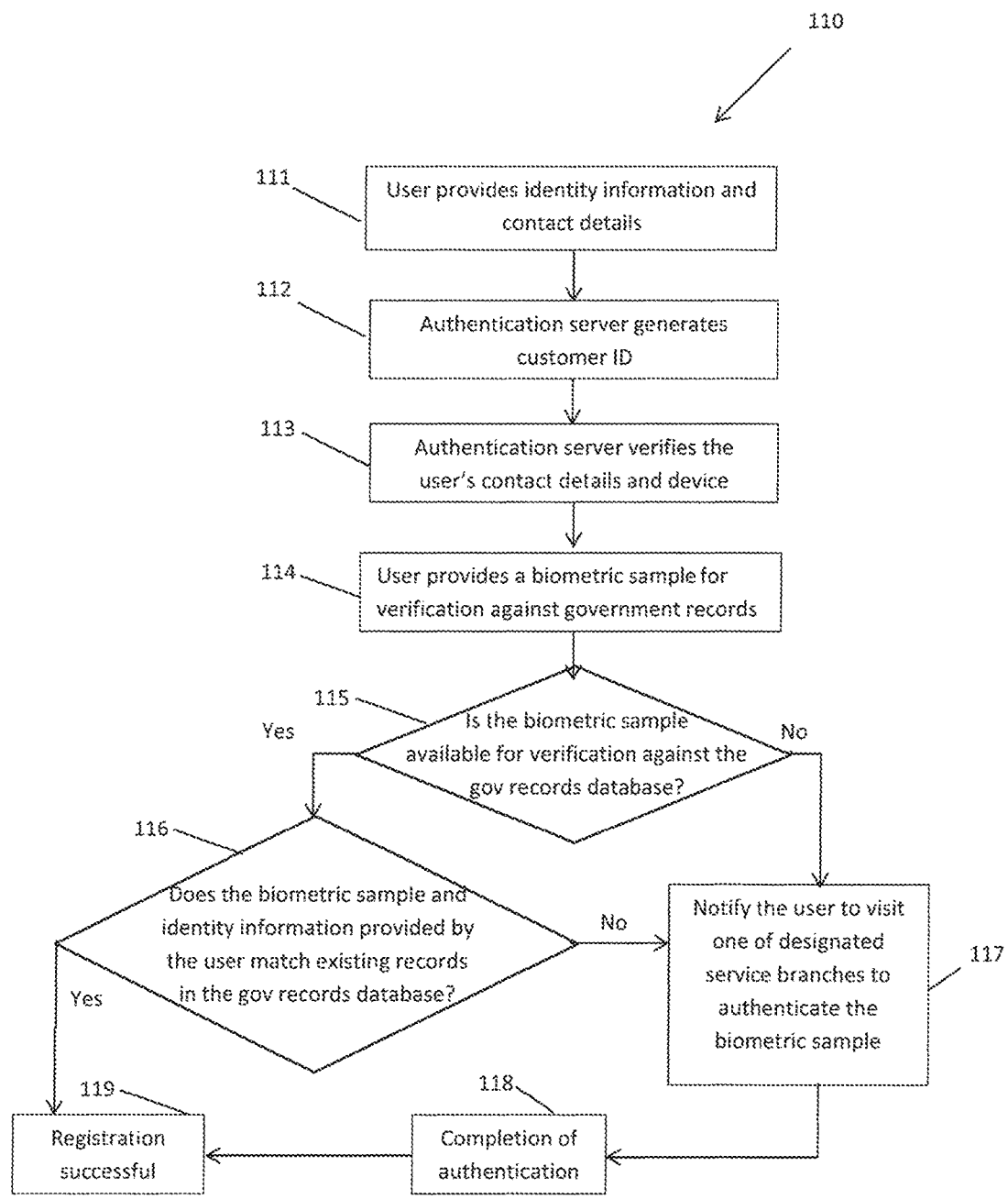
FIG. 3 is a flow diagram of a registration process in an exemplary method according to one embodiment.

FIG. 3 illustrates the user registration step 110 in more detail.

Following downloading and installation of SecureBoarding application on the user's communication device 4, the application is executed by the communication device 4 and prompts the user to create a user account.

The creation of the user account may require the user to input and submit registration details, at a step 111. The registration details may include, but are not limited to, the user's identity information such as user's full name, nationality, and/or identification number such as national ID, driver's license ID, or passport number. The registration details may further include contact details such as email address, phone number (e.g., the phone number associated with the communication device 4), and/or address. The registration details are communicated by the communication device 4 to the authentication system 3.

At a step 112, a unique identifier or user identification (User ID) is generated by the authentication system 3 and is provided for the communication device 4. Note that this step 112 may alternatively be performed upon the successful registration at step 119.

To verify that the creation of the user account is intended by the user and to verify the user's contact details and/or the communication device 4, the authentication system 3 may require the user to activate the account using an activation code. In particular, the authentication system 3 may communicate an activation code to the communication device 4 at step 113 based on the phone number submitted as the registration details. In another example, the activation code may be communicated to the email address instead, depending on the preference of the user. The activation code may be, for example, a 6-digit or 6-character one-time password (OTP) and the user is required to input or enter the OTP into the software application using the communication device 4.

Also at step 113, a device identifier characterizing the communication device 4 may also be communicated to the authentication system 3 for verification of the OTP by the authentication system 3. The device identifier may contain identifier data (e.g. serial number and/or MAC address) of the communication device 4 and may further include data analogous to or representative of the user's phone number of the communication device 4. The device identifier may thus be associated with the communication device 4, User ID, and user phone number. The unique User ID may be associated with only one user phone number which is operative on only one communication device 4 at any one time. Thus, the user account created by the user and identified by the User ID can only be operative on one communication device 4 at any one time.

Upon verification of the OTP by the authentication system 3 and successful activation of the user account, details of the user account and the User ID identifying the account are recorded on an accounts database. The accounts database may reside on the authentication system 3, or alternatively on a remote computer communicatively linked to the authentication system 3.

At step 114, the SecureBoarding application prompts the user to input his/her biometric sample for registration with his/her user account identified by the User ID. The prompt may be in the form of a visual notification displayed on the communication device 4. The user, in response, inputs the biometric sample via the communication device 4. The biometric sample is thus associated with the user account created by the user and identified by the User ID.

In this example, the biometric sample is a photograph of the user's face. Accordingly, a camera of the communication device 4 may be activated automatically to capture the image data of the user' face. The image data may be a still image of the user's face capture at the instant of registration. Alternatively, the image data may include a set of images, such as a series of images or a video sequence.

At step 115, the authentication system 3 determines if the biometric sample input by the user at step 114 can be validated, for example, by verifying against an existing biometric database maintained by a government authority, which stores a truthful correspondence between identity information of individuals and their respective biometric data information. For example, the captured photograph may be transmitted by the communication device 4 to the verification system 3. The verification system 3 causes the photograph to be compared against the existing biometric database which contains a reference photograph of an individual which corresponds to the identity of a given individual at step 116.

If the photographs match, the captured photograph provided by the communication device 4 is identified as a valid biometric sample, since the association between the face photograph and the identity of a given individual has been verified to be truthful. The validated biometric sample is stored as a reference biometric data and is associated with the user account created by the user and the User ID. The registration process is therefore successfully completed at step 119.

In another example, if the photographs do not match at step 116, then the captured photograph provided by the communication device 4 is identified as an invalid biometric sample. The user will be notified at step 117 to visit one of designated service branches to authenticate the photograph. The service branch may be administered by a government authority and the photograph may be captured at the service branch while witness by a staff, which may be a government officer at step 118. Accordingly, the photograph taken as such may be identified as authentic biometric sample and is stored as the reference biometric sample by the verification system 3 at step 119.

At step 119, the reference biometric data of the user collected by the authentication system 3, where available, is stored and updated on a biometric database. The biometric database may reside on the server of the authentication system 3, or alternatively on a remote computer communicatively linked to the authentication system 3. The biometric database also stores and updates reference biometric data of other users with other user accounts.

Upon successful registration of the reference biometric data with the User ID by the communication device 4 or by the verification system 3, the unique User ID of the user account created by the user is communicated to the communication device 4. The user may use the User ID for booking or making a reservation in relation to a facility 5 as described in steps 120-130 of method 100.

Figure 4:
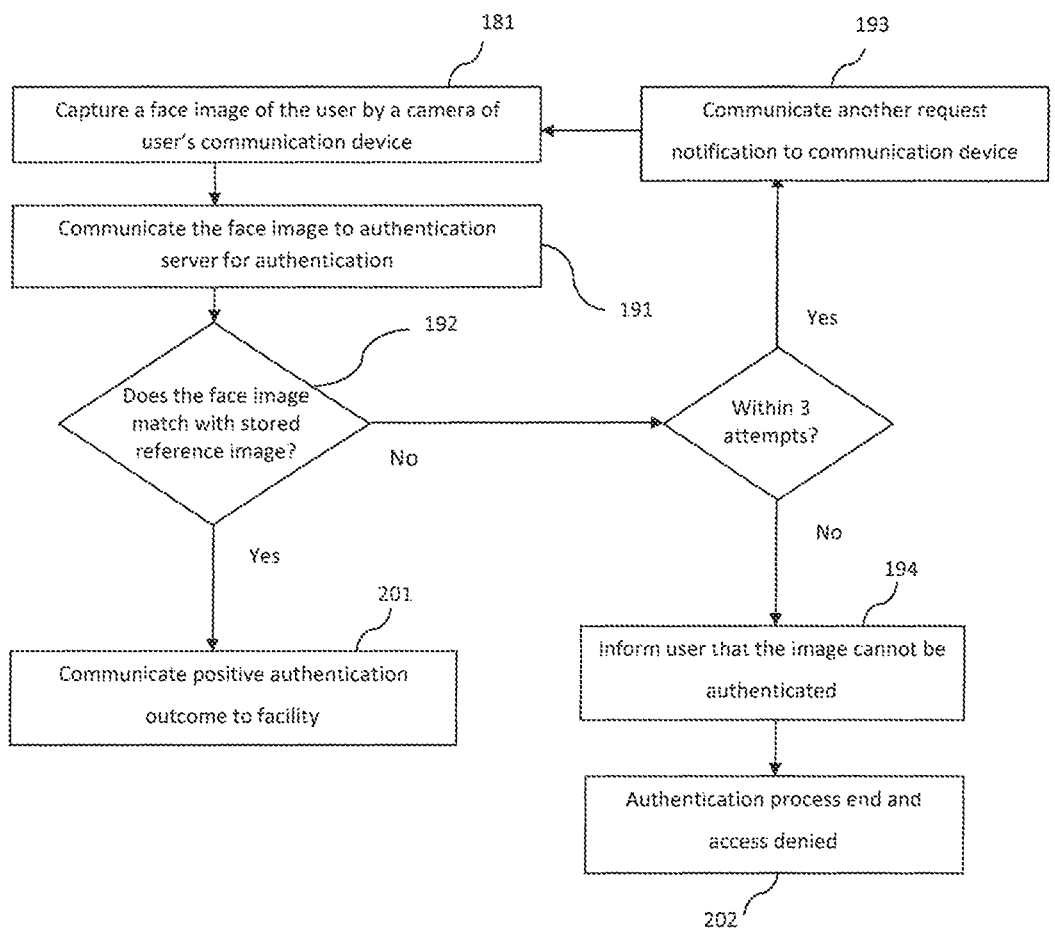
FIG. 4 is a flow diagram of an exemplary authentication step of the method shown in FIG. 2.

FIG. 4 illustrates a flow of authentication steps 180-200 of the method 100 in FIG. 2 according to one embodiment.

At step 181, the communication device 4 is configured to capture a face image of the user by the camera of the communication device 4. At step 191, the communication device 4 transmits the face photograph to the authentication system 3 for authentication. At step 192, the authentication system 3 is configured to compare the face photograph with the reference face photograph stored in the biometric database for a given user. If it is determined that the two photographs match, then the identity of the user is positively authenticated and the outcome is communicated to the verification system 3 at step 201. Otherwise in step 193, the authentication system 3 communicates another request notification to the communication device 4 for a further photograph for authentication, unless the number of attempts exceeds a predefined threshold, such as 3 times. If the face photograph fails to be authenticated after 3 attempts, the user is informed at step 194 of the failed authentication outcome and the access to the facility 5 is denied at step 202.

Figure 5A:
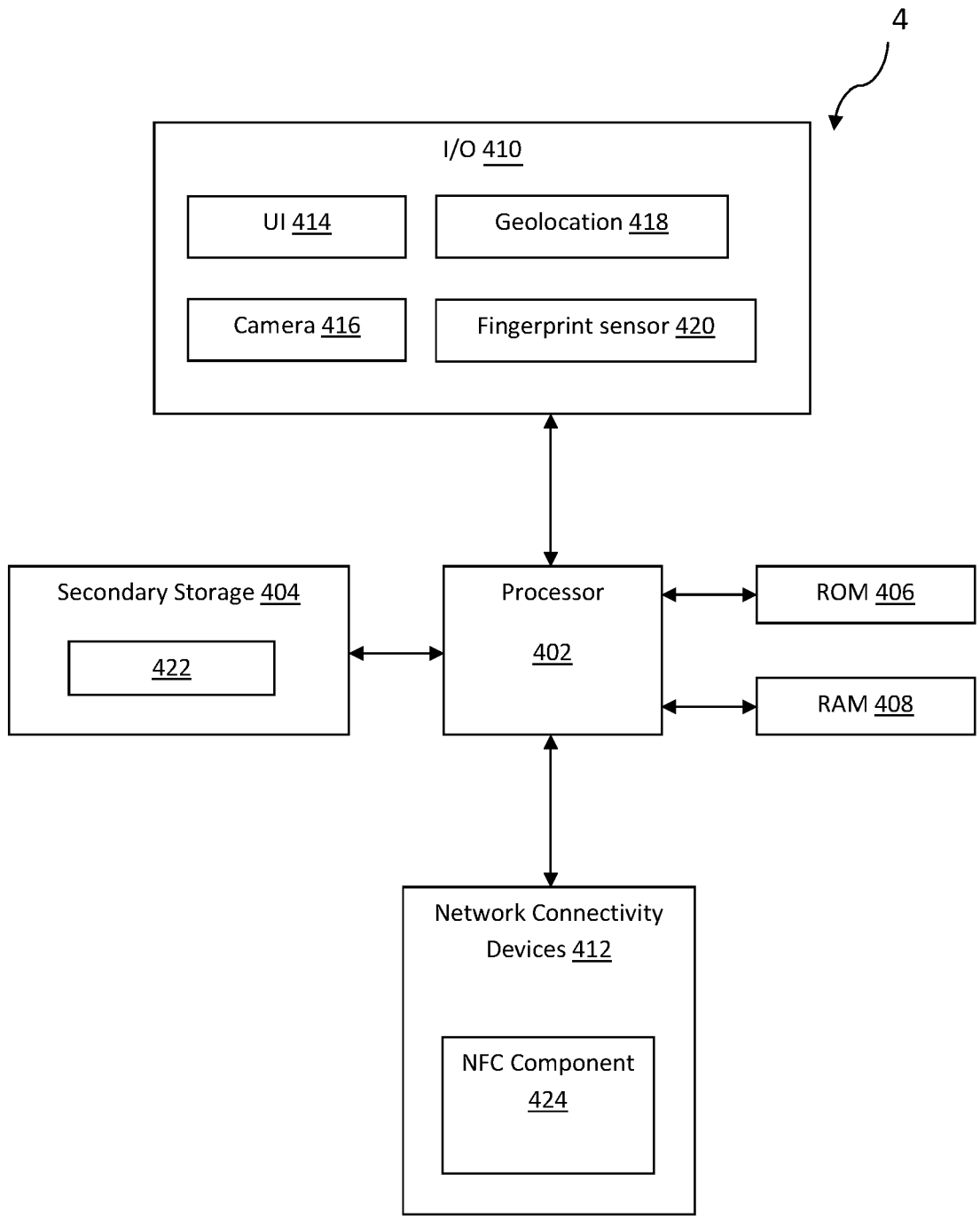
FIG. 5A is a block diagram illustrating the technical architecture of a communication device of the computerized network of FIG. 1.

FIG. 5A illustrates a block diagram showing a technical architecture of the communication device 4. The technical architecture includes a processor 402 (which may be referred to as a central processor unit or CPU) that is in communication with memory devices including secondary storage 404 (such as disk drives or memory cards), read only memory (ROM) 406, and random access memory (RAM) 408. The processor 402 may be implemented as one or more CPU chips. The technical architecture further includes input/output (I/O) devices 410, and network connectivity devices 412.

The I/O devices 410 include a user interface (UI) 414 and an image capture device or camera 416. The mobile device 4 may further include a geolocation module 418 and a fingerprint sensor 420. The UI 414 may include a touch screen, keyboard, keypad, or other known input devices. The camera 416 allows a user to capture image data and save the captured image data in electronic form on the communication device 4, e.g. on the secondary storage 404. The geolocation module 418 is operable to determine the geolocation of the mobile device 4 using signals from, for example global positioning system (GPS) satellites.

The secondary storage 404 typically includes a memory card or other storage device and is used for non-volatile storage of data and as an over-flow data storage device if RAM 408 is not large enough to hold all working data. Secondary storage 404 may be used to store programs which are loaded into RAM 408 when such programs are selected for execution.

The secondary storage 404 has a processing component 422, including non-transitory instructions operative by the processor 402 to perform various operations of the methods according to various embodiments of the present disclosure. The ROM 406 is used to store instructions and perhaps data which are read during program execution. The secondary storage 404, the ROM 406, and/or the RAM 408 may be referred to in some contexts as computer-readable storage media and/or non-transitory computer-readable media. Non-transitory computer-readable media includes all computer-readable media, with the sole exception being a transitory propagating signal per se.

The network connectivity devices 412 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. For example, the network connectivity devices 412 include an NFC component 424 of the communication device 4. These network connectivity devices 412 may enable the processor 402 to communicate with the Internet or one or more intranets. With such a network connection, it is contemplated that the processor 402 might receive information from the network, or might output information to the network in the course of performing the operations or steps of the methods described above. Such information, which is often represented as a sequence of instructions to be executed using processor 402, may be received from and outputted to the network, for example, in the form of a computer data signal embodied in a carrier wave.

The processor 402 executes instructions, codes, computer programs, scripts which it accesses from hard disk, floppy disk, optical disk (these various disk based systems may all be considered secondary storage 404), flash drive, ROM 306, RAM 308, or the network connectivity devices 412. While only one processor 402 is shown, multiple processors may be present. Thus, while instructions may be discussed as executed by a processor 402, the instructions may be executed simultaneously, serially, or otherwise executed by one or multiple processors 402.

Figure 5B:
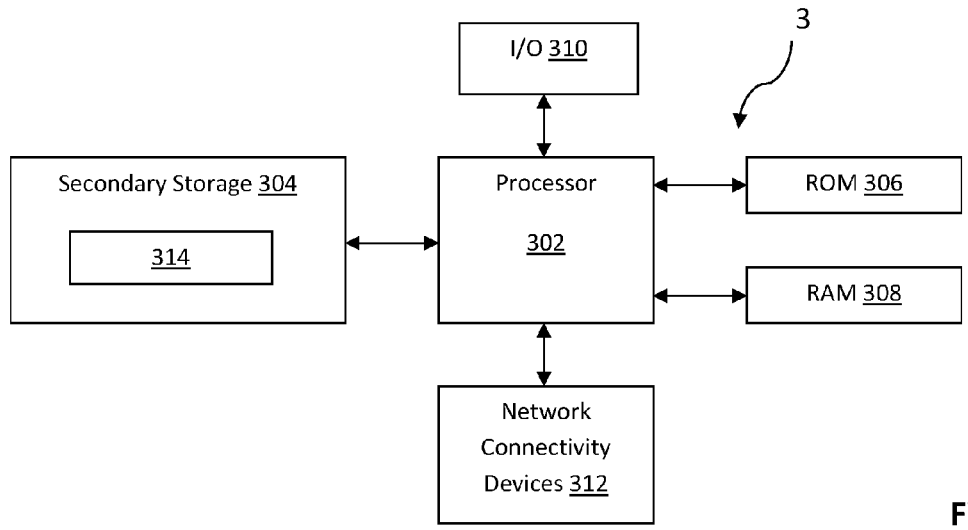
FIG. 5B is a block diagram illustrating the technical architecture of authentication system the computerized network of FIG. 1.
Figure 5C:
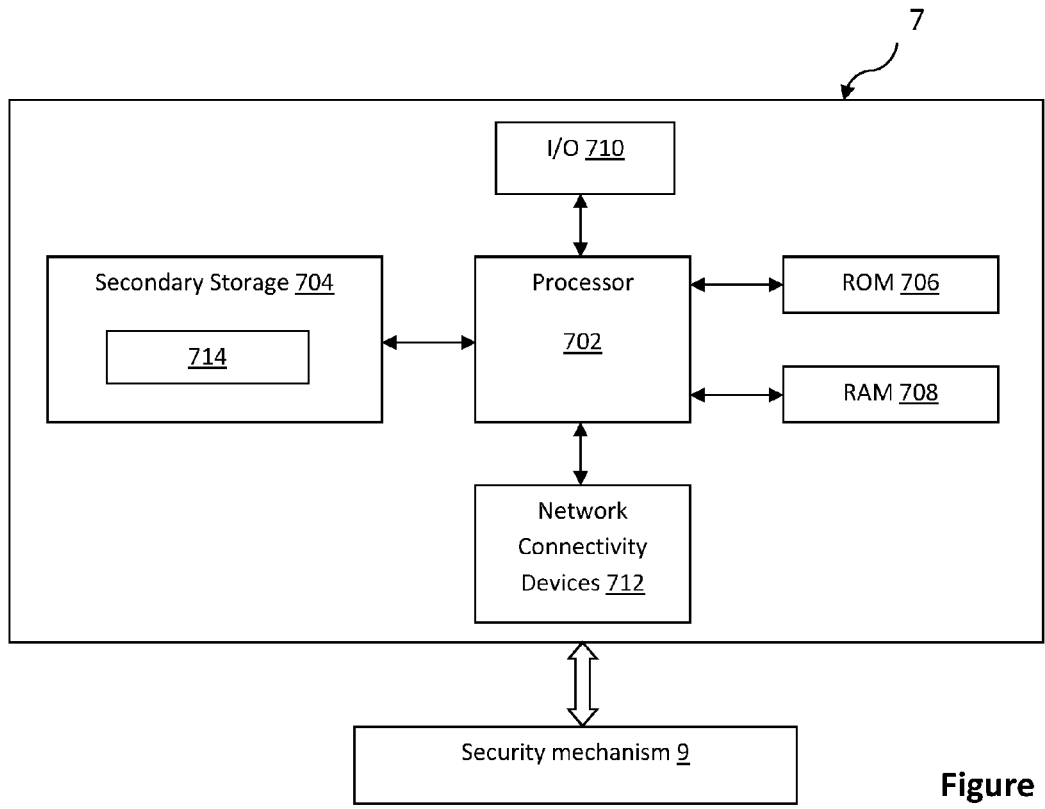
FIG. 5C is a block diagram illustrating the technical architecture of a verification system of the computerized network of FIG. 1.

FIGS. 5B and 5C illustrate block diagrams showing a technical architecture of the authentication system 3 and verification system 7, respectively. It would be readily apparent to the skilled person in the art that the authentication system 3 and verification system 7 have a similar technical architecture. In addition, the verification system 7 is communicatively linked with and/or integrated with the facility 5 for controlling and managing operations of the facility 5, which may further include operations of the security mechanism 7 or a set of security mechanisms 7 which may be part of or housed within the facility 5.

The technical architecture of the authentication system 3/verification system 7 includes a processor 302/702 (which may be referred to as a central processor unit or CPU) that is in communication with memory devices including secondary storage 304/704 (such as disk drives or memory cards), read only memory (ROM) 306/706, and random access memory (RAM) 308/708. The processor 302/702 may be implemented as one or more CPU chips. The technical architecture further includes input/output (I/O) devices 310/710, and network connectivity devices 312/712.

The secondary storage 304/704 typically includes a memory card or other storage device and is used for non-volatile storage of data and as an over-flow data storage device if RAM 308/708 is not large enough to hold all working data. Secondary storage 304/704 may be used to store programs which are loaded into RAM 308/708 when such programs are selected for execution.

The secondary storage 304/704 has a processing component 314/714, including non-transitory instructions operative by the processor 302/702 to perform various operations of the methods according to various embodiments of the present disclosure. The ROM 306/706 is used to store instructions and perhaps data which are read during program execution. The secondary storage 304/704, the ROM 306/706, and/or the RAM 308/708 may be referred to in some contexts as computer-readable storage media and/or non-transitory computer-readable media. Non-transitory computer-readable media include all computer-readable media, with the sole exception being a transitory propagating signal per se.

The I/O devices 310/710 may include printers, video monitors, liquid crystal displays (LCDs), plasma displays, touch screen displays, keyboards, keypads, switches, dials, mice, track balls, voice recognizers, card readers, paper tape readers, and/or other well-known input devices.

The network connectivity devices 312/712 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 312/712 may enable the processor 302/702 to communicate with the Internet or one or more intranets. With such a network connection, it is contemplated that the processor 302/702 might receive information from the network, or might output information to the network in the course of performing the operations or steps of the methods. Such information, which is often represented as a sequence of instructions to be executed using processor 302/702, may be received from and outputted to the network, for example, in the form of a computer data signal embodied in a carrier wave.

The processor 302/702 executes instructions, codes, computer programs, scripts which it accesses from hard disk, floppy disk, optical disk (these various disk based systems may all be considered secondary storage 304/704), flash drive, ROM 306/706, RAM 308/708, or the network connectivity devices 312/712. While only one processor 302/702 is shown, multiple processors may be present. Thus, while instructions may be discussed as executed by a processor, the instructions may be executed simultaneously, serially, or otherwise executed by one or multiple processors.

It should be appreciated that the technical architecture of authentication system 3/verification system 7 may be formed by one computer, or multiple computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the multiple computers. In an embodiment, virtualization software may be employed by the technical architecture to provide the functionality of a number of servers that is not directly bound to the number of computers in the technical architecture. In an embodiment, the functionality disclosed above may be provided by executing the application and/or applications in a cloud computing environment. Cloud computing may include providing computing services via a network connection using dynamically scalable computing resources. A cloud computing environment may be established by an enterprise and/or may be hired on an as-needed basis from a third party provider.

It is understood that by programming and/or loading executable instructions onto the technical architecture of the authentication system 3, verification system 7 and/or communication device 4, at least one of the CPU 302/702/402, the ROM 306/706/406, and the RAM 308/708/408 are changed, transforming the technical architecture in part into a specific purpose machine or apparatus having the functionality as taught by various embodiments of the present disclosure. It is fundamental to the electrical engineering and software engineering arts that functionality that can be implemented by loading executable software into a computer can be converted to a hardware implementation by well-known design rules.

In the foregoing detailed description, embodiments of the present disclosure in relation to a method and system for controlling access to a facility are described with reference to the provided figures. The description of the various embodiments herein is not intended to call out or be limited only to specific or particular representations of the present disclosure, but merely to illustrate non-limiting examples of the present disclosure. For example, the present disclosure may be extended to and for use in other different or distinct facilities 5 which may be physical or virtual, as would be readily apparent to and understood by the skilled person based on the present disclosure.

For a further example, the computerized network 1 may include a plurality of verification systems associated with respective facilities, and the authentication system 3 may function as a centralized server for providing authentication service to the plurality of verification systems.

What is claimed is:

1. A system for controlling access to a facility, the system comprising:
   a server;
   a detection unit configured to receive, from a communication device of a user, access details associated with the facility, the communication device located in the vicinity of the detection unit;
   a verification unit in communication with the detection unit, the verification unit configured to verify the access details;
   a communication unit operable to be in communication with the server, the communication unit configured to transmit an electronic request to the server for authentication of an identity of the user using an input of a biometric sample of the user on the communication device of the user, wherein the server is configured to:
   receive the electronic request for the authentication;
   identify, based on the electronic request, the communication device associated with the user;
   transmit a request notification to the communication device, the request notification requesting the authentication of the identity of the user using the input of the biometric sample of the user on the communication device;
   receive the biometric sample from the communication device, and obtaining a positive outcome of the authentication using the biometric sample and a reference database storing biometric data associated with a plurality of pre-registered users; and
   communicate the positive outcome of the authentication to cause authorization of the user to access the facility in response to the positive outcome of the authentication; and
   an authorization unit configured to authorize the user to access the facility in response to (i) receiving the positive outcome of the authentication from the server, and (ii) a positive outcome of the verification by the verification unit.

2. The system according to claim 1, wherein the authorization unit is configured to electronically generate a token to allow access to the facility upon presentation of the token by a user.

3. The system according to claim 1, wherein the authorization unit is configured to generate authorization data for deactivating a security mechanism maintained by the facility, the security mechanism, when in an activated state, preventing entry to the facility.

4. The system according to claim 3, wherein the authorization unit is configured to transmit an authorization notification encoding the authorization data to the communication device of the user to cause the security mechanism to be deactivated upon the authorization notification being communicated to the security mechanism by the communication device.

5. The system according to claim 3, further comprising the security mechanism, the security mechanism being an access control gate located in the vicinity of the facility.

6. The system according to claim 1, wherein the communication unit is configured to transmit the electronic request in response to the positive outcome of the verification of the access details.

7. A computerized method for controlling access to a facility, the method comprising:
   receiving from a communication device of a user, access details associated with the facility, the communication device located in the vicinity of a detection unit;
   verifying the access details;
   receiving, at a server, an electronic request for authentication of an identity of the user using an input of a biometric sample of the user on the communication device of the user;
   identifying, at the server, based on the electronic request, the communication device associated with the user;
   transmitting, from the server, a request notification to the communication device, the request notification requesting the authentication of the identity of the user using the input of the biometric sample of the user on the communication device;
   receiving, at the server, the biometric sample from the communication device and obtaining a positive outcome of the authentication using the biometric sample and a reference database storing biometric data associated with a plurality of pre-registered users;
   communicating, from the server, the positive outcome of the authentication to cause authorization of the user to access the facility in response to the positive outcome of the authentication; and
   authorizing the user to access the facility in response to (i) receiving the positive outcome of the authentication from the server, and (ii) a positive outcome of the verification.

8. The computerized method according to claim 7, wherein authorizing the user comprises electronically generating a token to allow access to the facility by a user upon presentation of the token.

9. The computerized method according to claim 7, wherein authorizing the user to access the facility comprises generating authorization data for deactivating a security mechanism maintained by the facility, the security mechanism, when in an activated state, preventing entry to the facility.

10. The computerized method according to claim 9, further comprising transmitting an authorization notification encoding the authorization data to the communication device of the user to cause the security mechanism to be deactivated upon the authorization notification being communicated to the security mechanism by the communication device.

11. The computerized method according to claim 9, wherein the security mechanism is an access control gate located in the vicinity of the facility.

12. The computerized method according to claim 7, further comprising transmitting the electronic request in response to the positive outcome of the verification of the access details.

13. The computerized method according to claim 7, wherein the access details include at least one of (i) information associated with the user's identity, and (ii) information associated with one of the user's use and reservation of the facility.

14. The computerized method according to claim 7, wherein causing authorization of the user to access the facility comprises generating authorization data for deactivating a security mechanism maintained by the facility, the security mechanism, when in an activated state, preventing entry to the facility.

15. The computerized method according to claim 7, wherein the electronic request encodes information associated with the user's identity and information associated with one of the user's use and reservation of the facility.

16. A computer server for controlling access to a facility, the computer server comprising a server processor, a data storage device storing server processor program instructions, the server processor program instructions being operative to cause the server processor to:

receive an electronic request for authentication of an identity of a human subject from a client, wherein the client transmits the electronic request using an input of a biometric sample of the human subject on a communication device of the human subject, wherein the communication device (i) transmits to the client access details associated with the facility and (ii) is located in the vicinity of the client and wherein the client is in communication with a verification unit that verifies the access details;

identify, based on the electronic request, the communication device associated with the human subject;

transmit a request notification to the communication device, the request notification requesting the authentication of the identity of the human subject using the input of the biometric sample of the human subject on the communication device;

receive the biometric sample from the communication device, and obtain a positive outcome of the authentication using the biometric sample and a reference database storing biometric data associated with a plurality of pre-registered users; and communicate the positive outcome of the authentication to the client to cause authorization of the human subject to access the facility in response to the positive outcome of the authentication, wherein the client is configured to authorize the human subject to access the facility in response to (i) receiving the positive outcome of the authentication, and (ii) a positive outcome of the verification.

17. The computer server according to claim 16, wherein the reference database is stored at the computer server.

18. The computer server according to claim 16, wherein the server processor program instructions are operative to cause the server processor to generate authorization data for deactivating a security mechanism maintained by the facility, the security mechanism, when in an activated state, preventing entry to the facility.

19. The computer server according to claim 16, wherein the electronic request encodes information associated with the user's identity and information associated with one of the user's use and reservation of the facility.

* * * * *